Jan. 20, 1959 M. CAMRAS 2,869,878

SOUND MOTION PICTURE FILM

Filed Feb. 9, 1951

Inventor
Marvin Camras
by Hill, Sherman, Meroni, Gross & Simpson Attys

United States Patent Office 2,869,878

Patented Jan. 20, 1959

2,869,878

SOUND MOTION PICTURE FILM

Marvin Camras, Chicago, Ill., assignor to Armour Research Foundation of Illinois Institute of Technology, Chicago, Ill., a corporation of Illinois Application February 9, 1951, Serial No. 210,223

3 Claims. (Cl. 274—41.4)

The present invention relates to a motion picture film provided with a magnetic sound track for reproducing audio signals impressed upon the sound track. The present invention is also concerned with a new method for manufacturing motion picture films having magnetic sound tracks thereon.

Many attempts have heretofore been made to produce a commercially acceptable motion picture film with a magnetic sound track. Since the magnetic sound track ordinarily is disposed on an edge of the motion picture film, between the marginal edge of the film and the edge of the sprocket holes, only a very limited area is available. In order that the magnetic recording on the sound track give an accurate reproduction of the signals impressed thereon, the dispersion of magnetic particles in the magnetic sound track should be quite uniform within this limited area. The difficulty with previously used methods for applying such magnetic sound track on the surface of the film arises primarily in securing a sound track of uniform thickness and width in proper alignment along the edge of the film.

One of the earliest processes for applying a dispersion of magnetic particles onto an edge of a motion picture film involved extruding a dispersion of magnetic particles in a suitable vehicle through a very narrow extrusion orifice. Several difficulties were encountered in this process. For one, the extremely small orifice necessary to provide the very narrow sound track became clogged by the dispersion of metallic particles. Also, the extruded layer of magnetic particles did not adhere satisfactorily to the surface of the film, and could be brushed off accidentally after the vehicle had dried. In addition, the sound track was hardly ever of uniform width because of the tendency of the extruded material to flow into minute crevices or depressions in the surfaces of the film. This disadvantage was particularly noticeable in the regions of the film immediately adjacent the sprocket holes, as in these regions, the film contains very slight surface irregularities which tend to cause the extruded metallic dispersion to spread toward the sprocket holes. Furthermore, the sound tracks produced were not of uniform thickness, even under ideal conditions.

In another process for applying a magnetic sound track onto a motion picture film, the track is applied as a thin ribbon in a decalcomania process, the ribbon of magnetic particles being pressed against the surface of the film, followed by removal of the adhesived backing material from the magnetic ribbon with suitable liquids. This process has several drawbacks, including the fact that the backing material cannot always be removed from the magnetic ribbon without causing breaks to appear in the deposited ribbon.

In the present invention I have provided a novel sound track assembly for motion picture films which avoids the difficulties involved in the types of sound tracks previously employed on film. In the present invention, the motion picture film is provided with a separate sound track which includes a self-sustaining support layer having the surface thereof coated with a relatively uniform dispersion of magnetic particles. This record member is securely bonded to the motion picture film, either at the surface of the film containing the photographic emulsion, or on the opposite surface.

Several advantages may be realized through the use of the motion picture film of the present invention. In a preferred embodiment of the invention, the magnetic sound track is elevated from the surface of the film by the thickness of the backing member employed. Thus, surface irregularities in the film do not present a problem, and the sound track can be applied to even severely scratched film. Another advantage of displacing the magnetic sound track from the surface of the film arises during winding of the film upon a reel, as the raised sound track serves to separate adjoining coils on the film, so that scratching of the adjoining surfaces are prevented during tensioning of the film upon the reel.

Another important aspect of the invention is the improved method for manufacturing the motion picture film of the present invention, as the method herein involved is quite economical, and lends itself very readily to continuous operation.

An object of the present invention is to provide an improved sound track for a motion picture film.

Another object of the present invention is to provide on a motion picture film a magnetic sound recording surface which is spaced vertically from the surface of the motion picture film.

Another object of the present invention is to provide a motion picture film with its sound track disposed at an angle to the plane of the film, thereby increasing the performance characteristics of the magnetic head with which the film is to be associated.

Another object of the present invention is to provide a method for incorporating a magnetic sound track on the surface of the motion picture film.

Still another object of the present invention is to provide a continuous method for applying a thin, magnetically coated ribbon on the edge of a photographic film in a rapid and convenient manner.

Another object of the present invention is to provide a method for manufacturing a motion picture film having a magnetic sound track of uniform thickness and width securely bonded thereto.

The sound film of the present invention includes a motion picture film base suitably composed of a cellulose derivative such as cellulose acetate or cellulose nitrate, or other transparent film material, coated with the usual photographic emulsion on a surface thereof. Securely bonded to either the emulsion surface or the non-emulsion surface of the photographic film is a self-sustaining flexible backing member of a thickness which is preferably less than that of the motion picture film, but still sufficient to provide a discernible difference in height between the surface of magnetic particles and the surface of the photographic film.

A further description of the present invention will be made in connection with the attached sheets of drawings in which.

As shown on the drawings.

Figure 1:
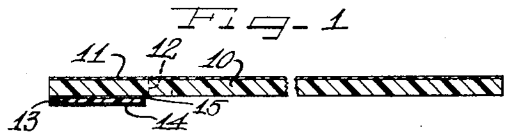
Figure 1 is an end view, in elevation, of a sound track applied to motion picture film.

In the form of the invention illustrated in Figure 1, the film stock comprises a base 10 of a material such as a cellulose acetate, cellulose, nitrate, or the like having the usual photographic emulsion surface 11 coated thereon. Ordinarily, this thickness of the stock of base 10 will be on the order of 5 to 6 mils (.005 to .006 inch), while the thickness of the emulsion layer will be on the order of ½ mil.

The film base has the usual spaced sprocket holes 12 extending therethrough for engaging a sprocket wheel on the motion picture projector.

On the surface of the film opposite the emulsion surface 11, there is a magnetic sound track including a flexible, self-sustaining backing portion 13, with its outer surface coated with a uniform dispersion of high coercive force magnetic particles 14. The sound track may be bonded to the edge of the photographic film by means of an extremely thin layer of adhesive 15, or by welding the surfaces of the film together by application of heat.

Any suitable flexible material can be employed for the backing 13, as illustrated in Figure 1, provided that the material of the backing has a thermal coefficient of expansion of the same order of magnitude as the material of the film base. For example, cellulose derivatives similar to those used in the body 10 of the photographic film may be employed. Alternatively, material such as paper can be used to advantage. The use of a material for the backing layer 13 of the same composition as the body 10 of the photographic film has the advantage that the layer of adhesive 15 can be eliminated. When this type of structure is employed, the sound track can be rigidly secured to the body of the photographic film merely by moistening the base of the backing with a suitable solvent such as acetone in the case of cellulose acetate, or ethylene glycol monomethyl ether acetate, cellulose ethers and the like and pressing the two surfaces together. Upon evaporation of the solvent, or absorption into the body of the film, the sound track will be rigidly bonded to the surface of the film. Where the bonding is done by means of a solvent only, followed by pressure, the overall thickness of the finished product may be less than the combined thicknesses of the original component layer materials.

The thickness of the sound track may vary over a considerable range, but with a photographic film of a thickness from 5 mils to 6 mils, I prefer to use a sound track in which the thickness of the backing is on the order of 1½ mils, with a magnetic coating of about ½ mil in thickness uniformly distributed thereon, although a thinner backing may be provided to minimize buildup, and the thickness of the magnetic layer may also be varied considerably. In the case where an extraneous adhesive is added to the composition, such as a solution of cellulose nitrate in acetone, or in mixtures of solvents such as amyl acetate, ethyl alcohol, and toluene, the thickness of the adhesive layer will normally be less than ⅒ mil.

Figure 2:
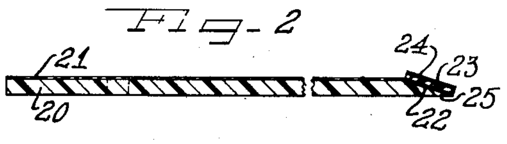
Figure 2 is a modified form of a motion picture film of the present invention in which the sound track is disposed on a beveled edge of a motion picture film stock.

In the form of the invention illustrated in Figure 2, a motion picture film including a body portion 20, and the emulsion surface 21, is provided with a beveled edge 22 along one marginal portion of the film. Secured along the beveled edge 22 is a magnetic sound track including a self-sustaining backing 23, a magnetic coating 24 on the backing, and, if desired, a thin layer of adhesive 25 joining the magnetic sound track to the beveled edge 22. This type of structure has been found advantageous in certain installations because it permits better conformance of the magnetic sound track to the magnetic transducer head which is associated with the magnetic sound system.

Figure 3:
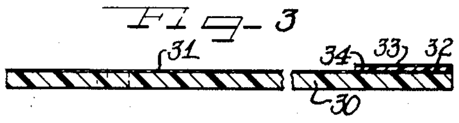
Figure 3 is another modified form of the invention employing a film stock in which the sound track is disposed in a recess provided in the surface of the film.

Most organic adhesive substances adhere better to the base of cellulose derivative than they do to the photographic emulsion coated surface of a photographic film. This feature has been advantageously employed in the embodiment of the invention illustrated in Figure 3. The structure therein shown includes a body of a cellulose derivative 30 with a photographic emulsion layer 31. In this instance, the magnetic sound track is applied directly to the base 30 by removing the emulsion along the marginal edge of the film to a width sufficient to accommodate the magnetic record track. A straight-edged cutting tool can readily be employed to remove the emulsion from selected areas of the film. The structure of the magnetic record track illustrated in Figure 3 is the same as in the previous figures and includes a backing member 32 and a magnetic particle layer 33 thereover, with the magnetic sound track being secured to the body 30 by means of a thin adhesive layer 34. As previously illustrated, the thickness of the backing member 32 is substantially greater than the thickness of the emulsion layer 31, so that even after removal of the emulsion layer, the magnetic record surface 33 is still spaced vertically from the emulsion surface 31 of the film.

Figure 3A:
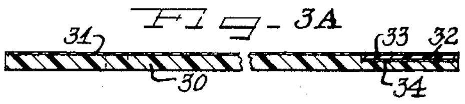
Figure 3A is a modified form of the structure shown in Figure 3.

While it is preferable that the sound track be elevated from the plane of the film, it will not always be necessary to use this type of structure. In some installations it may be desirable to have the sound recording surface flush with or even below the emulsion surface, as illustrated in Figure 3A.

Figure 4:
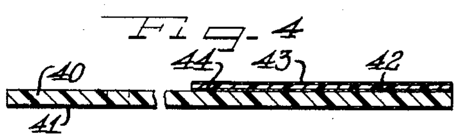
Figure 4 is another modified form of the invention in which a relatively wide sound track is incorporated onto the rear or non-emulsion surface of a photographic film.

In the form of the invention illustrated in Figure 4, a motion picture film of the conventional 16 mm. variety, having a body 40 and an emulsion surface 41 thereon is provided with a relatively wide magnetic sound track on the surface of the film opposite that of the emulsion surface 41. The sound track includes a backing 42, an outer layer 43 of magnetizable particles, and, if desired, a thin adhesive layer 44 joining the sound track to the surface of the film.

Figure 4A:
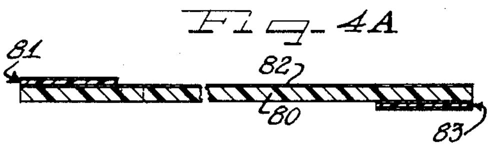
Figure 4A illustrates a film with a dual magnetic sound track.

In Figure 4A, the film base 80 is provided with two sound tracks, one sound track, 81, being secured to an edge of the emulsion surface 82 after removal of the emulsion, and the other track 83 being adhesively secured to the opposed edge and surface of the film. This type of structure equalizes reeling, and allows either track to be played alternatively on the same machine.

Figure 5:
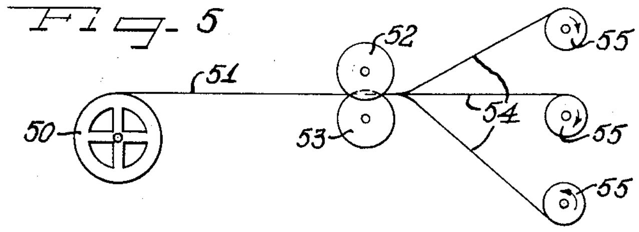
Figure 5 is a schematic representation of a method which may be employed in preparing the relatively narrow magnetic sound tracks of the present invention prior to their incorporation onto the surface of a photographic film.

Clearly, it is far simpler to coat a relatively wide backing member with a dispersion of magnetic particles than it is to coat similarly a relatively narrow backing member. When coating a relatively wide member, the surface of the member can be coated with the magnetic particle dispersion by the use of a coating roller, doctor knife, extrusion through a relatively wide orifice, or even spraying. These techniques are not particularly feasible for the coating of an extremely narrow backing member. Accordingly, in producing the sound track of the present invention, a relatively wide backing member which has been precoated with a dispersion of magnetic particles is employed. In Figure 5, such a record member, which will normally have a width of about ¼″ or more, is shown as being supplied continuously from a supply spool 50. If desired, the record member may already contain a pre-recorded program thereon. The record member 51 is passed continuously through a series of cutting knives 52 and 53. These knives include a series of staggered blades which function to slit the relatively wide record member 51 into a plurality of relatively narrow magnetic ribbons 54. Each of the ribbons 54 is trained about a separate take-up reel 55.

The width of the ribbon produced by the cutting knives will depend upon the width of the sound track desired on the film. For ordinary 8 or 16 mm. sound film, the width will ordinarily be between 1/64 and 1/32 of an inch. Thus, if the record member 51 were originally 1/4" in width, the member could be cut into eight ribbons each of a thickness of 1/32 of an inch.

Figure 6:
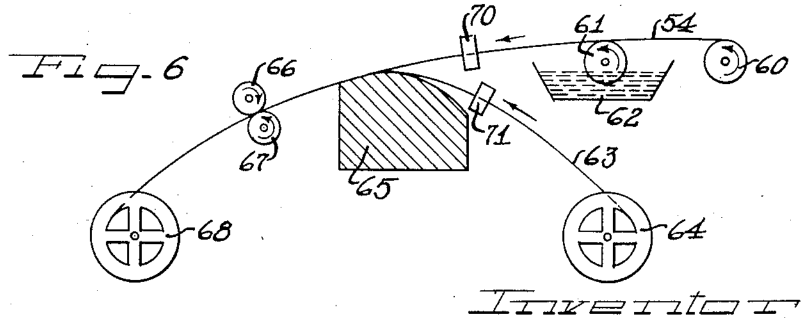
Figure 6 is a schematic representation of the process involved in applying the magnetic ribbon produced in Figure 5 to a surface of the photographic film.

A continuous process for applying the magnetically surfaced ribbon 54 to the surface of a photographic film is illustrated in Figure 6.

As shown in Figure 6, a magnetic ribbon 54 is continuously fed from a rotating supply reel 60 into contact with a rotating applicator roll 61 partially immersed in a liquid bath of an adhesive composition 62. A thin film of adhesive is thereby applied to the surface of the ribbon 54 opposite from the surface containing the dispersion of magnetic particles.

At the same time, a continuous web 63 of motion picture film is unwound from a film supply reel 64. The ribbon 54 is joined to the web 63 of motion picture film by passage of the ribbon and the web over an arcuately shaped forming surface 65. Suitable guide means such as a pair of adjustable forked fingers 70 and 71 are associated with the forming surface 65 to align the ribbon 54 onto the proper area of the web 63. After the original deposition of the ribbon 54 on the web 63, the resulting laminated structure may be pressed by means of a pair of coacting pressure rolls 66 and 67, and the completed structure is then wound upon a take-up reel 68 for storage.

If the magnetic track is secured to the film before photographic processing, it is advantageous to bond the track to the base of the film, rather than to the emulsion surface, since the latter softens and swells in the developing bath, and shrinks and rehardens when dried.

While the slitting, application of adhesive, and application of the sound track to the film have been illustrated in separate phases, it will be appreciated that all these operations can be carried out continuously on a single machine.

It will be understood that modifications and variations may be effected without departing from thhe scope of the novel concepts of the present invention.

I claim as my invention:

1. A motion picture film comprising a flexible base having a beveled marginal edge and a relatively narrow self-sustaining flexible strip having a surface covered with a relatively uniform dispersion of magnetic particles, said strip being secured to said base along and upon said beveled edge.

2. A motion picture film comprising a flexible base having a planar surface terminating in a beveled margin, a relatively narrow, self-sustaining strip of the same width as said beveled margin and having a magnetic particle coating on one surface thereof, and an adhesive uniting the opposite surface of said strip to said beveled margin, said coating being raised above said planar surface at the junction between said planar surface and said beveled margin.

3. A motion picture film comprising a flexible film base of cellulose acetate of 5–6 mils thickness presenting a planar surface to be exposed to light and terminating in a beveled margin and a self-sustaining flexible supporting strip of cellulose acetate of 1½ mils thickness narrower in width than the base for exposing a substantial width of the planar surface to light, said strip having one surface covered with a magnetizable layer of ½ mils thickness of magnetic particles secured to the strip and its opposite surface firmly secured to the beveled margin of said base, said magnetizable layer presenting an uncovered surface projecting beyond and angularly with respect to said planar surface to insure intimate contact between the magnetizable layer and a magnetic transducer head.

References Cited in the file of this patent

UNITED STATES PATENTS

| | | |
|---|---|---|
| 1,088,533 | Cameron et al. | Feb. 24, 1914 |
| 1,259,834 | Cameron et al. | Mar. 19, 1918 |
| 1,832,097 | Chipman | Nov. 17, 1931 |
| 1,829,912 | Shearer | Nov. 3, 1931 |
| 1,883,562 | Chipman et al. | Oct. 18, 1932 |
| 2,029,979 | Bernheim | Feb. 4, 1936 |
| 2,048,497 | Elmer | July 21, 1936 |
| 2,074,406 | Lohn | Mar. 23, 1937 |
| 2,254,394 | Ratley et al. | Sept. 2, 1941 |
| 2,373,500 | Pearce | Apr. 10, 1945 |
| 2,479,868 | Rossmann et al. | Aug. 23, 1949 |
| 2,479,869 | Rossmann et al. | Aug. 23, 1949 |
| 2,480,162 | Rath | Aug. 30, 1949 |
| 2,536,029 | Camras | Jan. 2, 1951 |
| 2,541,136 | Warren | Feb. 13, 1951 |
| 2,581,765 | Mann | Jan. 8, 1952 |
| 2,645,270 | Speed et al. | July 14, 1953 |
| 2,657,932 | Blaney | Nov. 3, 1953 |